(12) United States Patent
Rossmann et al.

(10) Patent No.: US 10,692,137 B2
(45) Date of Patent: Jun. 23, 2020

(54) AUTOMATED CHECK DEPOSIT DECISIONS

(71) Applicant: NCR Corporation, Duluth, GA (US)

(72) Inventors: Wolf Rossmann, Glamis (GB); Gordon D. Patton, Tayport Fife (GB)

(73) Assignee: NCR Corporation, Atlanta, GA (US)

( * ) Notice: Subject to any disclaimer, the term of this patent is extended or adjusted under 35 U.S.C. 154(b) by 312 days.

(21) Appl. No.: 14/291,630

(22) Filed: May 30, 2014

(65) Prior Publication Data

US 2015/0348184 A1 Dec. 3, 2015

(51) Int. Cl.
*G06Q 40/02* (2012.01)
*G07F 19/00* (2006.01)
*G06Q 20/04* (2012.01)

(52) U.S. Cl.
CPC ........ *G06Q 40/02* (2013.01); *G06Q 20/042* (2013.01); *G07F 19/202* (2013.01)

(58) Field of Classification Search
None
See application file for complete search history.

(56) References Cited

U.S. PATENT DOCUMENTS

| | | | | |
|---|---|---|---|---|
| 4,617,457 A * | 10/1986 | Granzow | ........... | A47F 9/00 235/379 |
| 6,038,553 A * | 3/2000 | Hyde, Jr. | ........... | G06Q 20/042 235/379 |
| 7,857,207 B1 * | 12/2010 | Hopkins, III | ........... | G07F 19/20 221/9 |
| 8,444,050 B2 | 5/2013 | Davila et al. | | |
| 8,833,639 B1 * | 9/2014 | Hopkins, III | ........... | G06Q 20/1085 235/375 |
| 2007/0084911 A1 * | 4/2007 | Crowell | ........... | G06Q 20/042 235/379 |
| 2008/0093441 A1 * | 4/2008 | Taylor | ........... | G07F 19/20 235/379 |
| 2008/0195514 A1 * | 8/2008 | Garg | ........... | G06O 20/04 705/35 |
| 2010/0138343 A1 * | 6/2010 | Davila | ........... | G06Q 20/042 705/43 |
| 2010/0145853 A1 * | 6/2010 | Davila | ........... | G06Q 20/042 705/43 |

(Continued)

FOREIGN PATENT DOCUMENTS

CN 101110146 A 1/2008
CN 101176105 A 5/2008
(Continued)

OTHER PUBLICATIONS

McGrath, Jane. "Is It Safe to Deposit Checks through an ATM?" HowStuffWorks, HowStuffWorks, Jan. 25, 2010, money.howstuffworks.com/personal-finance/online-banking/deposit-checks-through-atm1.htm. (Year: 2010).*

*Primary Examiner* — Kito R Robinson
*Assistant Examiner* — Shacole C Tibljas
(74) *Attorney, Agent, or Firm* — Schwegman, Lundberg & Woessner

(57) ABSTRACT

A customer attempts to deposit a check and receives an unacceptable decision. An automated decision process is initiated to evaluate the unacceptable decision based on governmental regulations, transaction details, customer profile information, and/or bank business rules. A new decision is automatically provided to the customer based on the automated decision process's decision.

18 Claims, 4 Drawing Sheets

(56) References Cited

U.S. PATENT DOCUMENTS

| | | | | |
|---|---|---|---|---|
| 2010/0145857 A1* | 6/2010 | Davila | ............... | G06Q 20/042 |
| | | | | 705/44 |
| 2010/0306071 A1* | 12/2010 | Kay | ............... | G06Q 20/207 |
| | | | | 705/19 |
| 2011/0251956 A1* | 10/2011 | Cantley | ............... | G06Q 20/042 |
| | | | | 705/43 |
| 2013/0275302 A1 | 10/2013 | Lee et al. | | |
| 2014/0081858 A1* | 3/2014 | Block | ............... | G07F 19/207 |
| | | | | 705/43 |
| 2014/0337213 A1* | 11/2014 | Chang | ............... | G07F 19/201 |
| | | | | 705/43 |
| 2016/0180310 A1* | 6/2016 | Taylor | ............... | G06Q 20/1085 |
| | | | | 705/21 |

FOREIGN PATENT DOCUMENTS

| | | |
|---|---|---|
| CN | 201777682 U | 5/2010 |
| CN | 103314387 A | 9/2013 |
| WO | 2011/100364 | 8/2011 |
| WO | 2013009870 A1 | 1/2013 |

* cited by examiner

AUTOMATED CHECK DEPOSIT DECISIONS

BACKGROUND

When a customer deposit a check at an Automated Teller Machine (ATM) or in person, the United States Government imposes a variety of restrictions on the bank.

One such restriction is referred to as Regulation CC (Expedited Funds Availability Act). This imposes a minimum amount of time, given certain conditions, that the bank may permissible hold the funds associated with the check before releasing them to the consumer. This is designed to protect both the consumer and the bank.

However, nothing restricts a bank from being more generous and releasing funds associated with a check deposit before Regulation CC says the funds has to be released. The bank may want to do this for a variety of reasons, such as to distinguish itself over other banks to gain a competitive advantage or to engender customer loyalty for its most valued customers. Given that competition is fierce in the banking industry, banks are looking for ways to improve their position with their customers and to attract new customers.

But, whenever a bank decides to be more generous than what the Regulations CC would call for, the bank assumes the risk when something goes awry with the consumer check deposited. This could prove costly to the bank. Thus, some banks have a variety of business rules that can be used to assist a teller in making a decision as to whether to put a smaller hold on a deposited check. These decisions can be voluminous and complicated and often real time decisions with the customer still present attempting to deposit a check is impractical.

Furthermore, Regulation CC permits (in some cases) for funds to be held longer period of time than is defined in Regulation CC in some exceptional circumstances.

Moreover, these manual decisions by tellers are often not available when a consumer makes a deposit via an ATM.

It should also be noted that it is not just the United States and its Regulation CC, but many other countries of the world have similar types of laws with respect to the hold times on deposited checks. So, the banking issue is a world-wide issue and not just a United States issue.

Thus, automated check deposit decisions are needed for tellers to determine whether to places a shorter hold on deposited checks than what Regulation CC would recommend.

SUMMARY

In various embodiments, methods and an Automated Teller Machine (ATM) for automated check deposit decisions are presented.

According to an embodiment, a method for automated check deposit decisions is provided. Specifically, in an embodiment, an adverse decision with respect to a check deposit is received. The adverse decision is rerouted with transaction details to an automated decision process. Next, a new decision with respect to the check deposit is obtained from the automated decision process.

DETAILED DESCRIPTION

Figure 1:
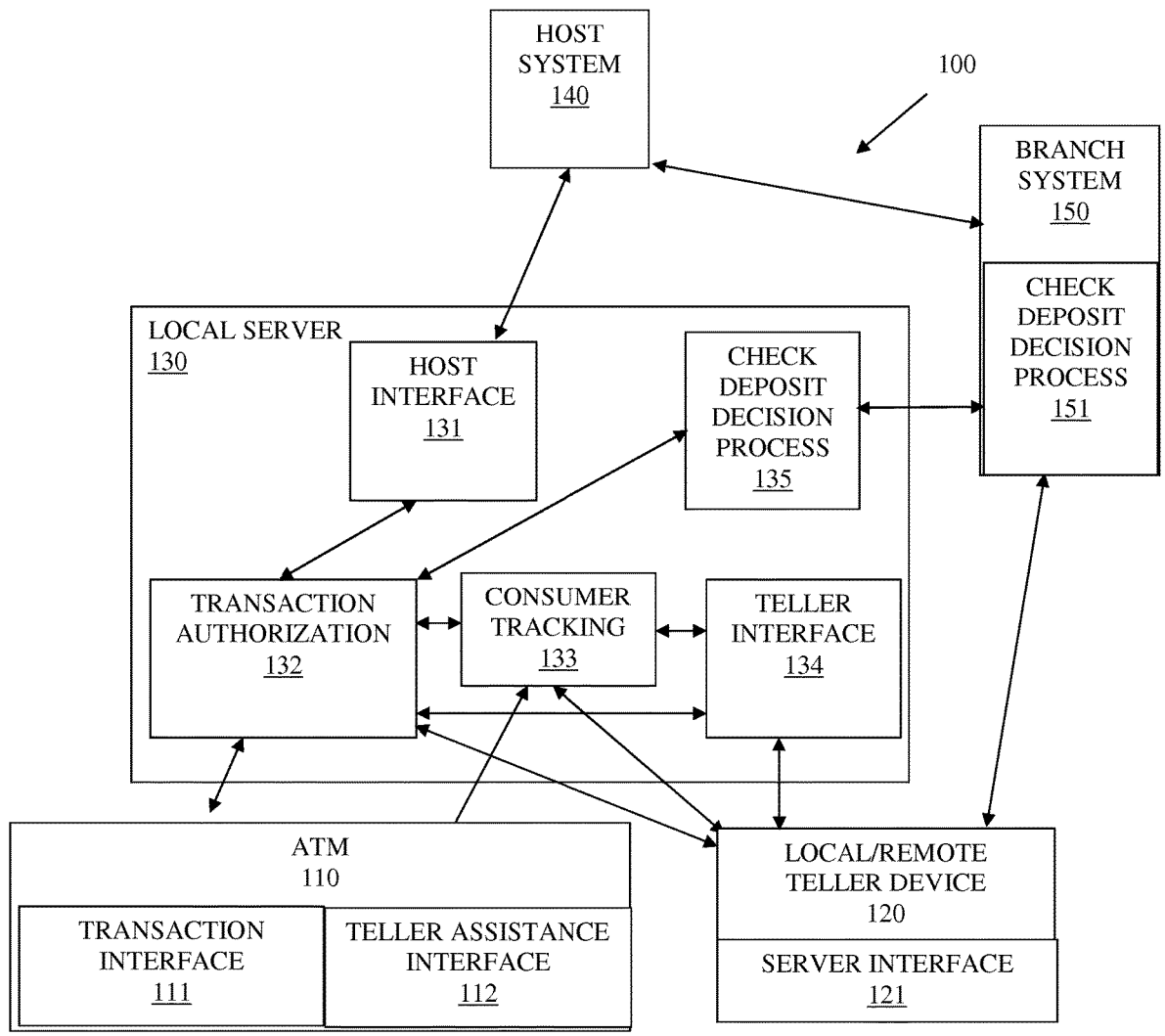
FIG. 1 is a diagram of a bank branch having automated check deposit decision making capabilities, according to an example embodiment.

FIG. 1 is a diagram of a bank branch 100 having automated check deposit decision making capabilities, according to an example embodiment. The various components are illustrated and the arrangement of the components is presented for purposes of illustration only. It is to be noted that other arrangements with more or less components are possible without departing from the onsite automated customer assistance teachings presented herein and below.

The techniques and methods presented herein and below for onsite automated check deposit decision making can be implemented in whole or in part in one, all, or some combination of the components shown with the FIG. 1. The techniques and methods are programmed as executable instructions in memory and/or non-transitory computer-readable storage media and processed on one or more processors associated with the various components.

The example bank branch 100 includes an Automated Teller Machine (ATM) 110, a local and/or remote teller device 120, a local server 130, a host system 140, and the bank branch system 150. The ATM 110 includes a transaction interface 111 and a teller assistance interface 112. The local/remote teller device 120 includes a server interface 121 to both the local server 130 and the bank system 150. The local server 130 includes a host interface 131 for interacting with the host system 140, a transaction authorization module 132, a consumer tracking module 133, a teller interface 134, and, optionally, a check deposit decision process 135. The branch system 150 includes a check deposit decision process 151.

The various components of the FIG. 1 are now discussed within the context of an operation scenario for an automated bank branch 100 where a consumer (can also be referred to herein as a "customer") enters the bank branch 100 to deposit a check. The bank branch 100 also has onsite at least one teller or clerk available to assist the consumer if needed and, optionally, provides remote teller assistance via video link.

As noted above, a bank has to conform to governmental regulations as to the minimum holds that can be placed on checks deposited with the bank. Many governments have regulations, but for purposes of illustration Regulation CC of the United States is discussed in the examples that follow.

Regulation CC has three main requirements of a bank for a deposited check and four exceptions. The first requirement is that for a check of $200 or less the bank must release the funds the next business day following the deposit of that check. The second requirement is that for any check that exceeds $5000, the bank must release at least $5,000 the second business day following the deposit of the check and any remaining balance by the seventh business day following the deposit of the check. The third requirement is that any check deposited by a consumer that has not had an account with the bank for at least thirty days, the bank must release funds related to the deposited check by the ninth business day following the check's deposit.

The four exceptions are as follows: 1) if a customer has been overdrawn on his/her account more than six times over the past six months the funds for a deposited check can be released on the seventh business day following the deposit; 2) if the bank has reason to doubt that the check is good (potential fraud, different bank rejected it, etc.), the funds are released the seventh business day following the deposit; 3) if the check is a copy of a previous check returned for insufficient funds; the funds are released the seventh business day following the deposit; and 4) if the check was accepted by the bank during a power outage at the bank or during a computer failure at the bank, the funds are released the seventh business day following the deposit.

In addition, government regulations change more frequently and easily than laws, since regulations are promulgated by agencies (at least in the United States) and do not undergo the same rigid process that passing laws do.

As stated before, each bank may have its own rules regarding check deposits to make sure the bank minimizes its risks and maximizes customer satisfaction while complying with any governmental regulations (such as Regulation CC in the United States).

Some factors that a bank may want to consider include, but is not limited to, payee listed on the check, amount to be paid from the check, account balance of the customer depositing the check, loyalty level of the customer depositing the check, length of time customer has been with the bank, quality of the check (readability, any physical damage, cross out markings, etc.), account history for the customer, current account status for the customer, and other factors.

One problem is that it can be very costly for a bank if a teller makes a wrong decision about a bad check or costly if the teller fails to properly comply with Regulation CC.

Initially, when the customer enters the bank branch 100, the customer can choose to deposit a check at the ATM 100 or in person with a teller at a teller station (not shown in the FIG. 1).

In the first scenario, the customer elects to deposit a check at the ATM 100 by using the transaction interface 111. This passes the transaction through the transaction authorization module 132 of the local server 130. The transaction authorization module 132 passes the check deposit request to both the host interface 131 and the consumer tracking module 133. The host interface 131 relays the transaction (having an image of the check) and customer entered amount for the check along with account details and customer encrypted PIN to the host system 140.

The customer then receives a response from the host system 140 indicating that the check is rejected and cannot be deposited (maybe because of poor quality, maybe because the customer entered deposit amount does not match what the host system parsed from the check image or other reasons. Alternatively, the host system 140 indicates the check is acceptable but there are a predefined number of days that the check is being placed on hold by the bank. Also, in some instances, the host system 140 may indicate that a teller must manually review the check; otherwise acceptance of the check is unacceptable to the bank.

The check image and transaction details along with the response from the host system 140 can also be relayed through the transaction authorization module 132 to the consumer tracking module 133 and forwarded to the teller interface 134 where it is sent to a local or remote teller device 120 through the server interface 121. So, at this point a local or remote teller is equipped with the check image and the transaction details and the decision of the host system 140 while the customer is still present at the ATM 100. Using the teller interface 134 and the customer tracking interface 133 the teller can activate the teller assistance interface 112 of the ATM 100 and ask the customer if the customer would like assistance to see if the teller can do any better than the initial decision from the host system 140. Alternatively, before the teller had a chance to ask the consumer, via the teller assistance interface 112, the customer may have activated the teller assistance interface 112 for assistance on the decision made by the host system 140.

The teller then uses the teller device 120 to activate the check deposit decision process 151 of the branch system 150 and provides the transaction details, customer details (acquired through the transaction details), and an image of the check.

The check deposit decision process 151 includes a matrix of rules for the governmental regulations and for the banks rules (both discussed above). Features from the check and information extracted from the check image along with the matrix of rules are processed to arrive at a decision, which may be the same as the host decision, maybe worse, or maybe better. The teller is then presented with the automated decision to communicate to the customer regarding the check deposit on the teller device 120. The decision can be one of: using a hold period before releasing funds related to the check that comply with the governmental regulations, extending the hold period beyond the governmental regulations, rejecting the check and instructing the ATM 110 to return the check to the customer, making some of the funds available immediately with the remaining on hold for some period of time, reducing the hold period dictated by the host system 140, or making all the funds immediately available to the customer.

In an embodiment, the teller is presented a limited number of options to choose from, which indicates that any of these teller-selected options are acceptable to the bank.

The matrix of rules is text-based information or files that can be changed dynamically without modifying the driving logic of the check deposit decision process 151. So, changes can be easily made and integrated as government regulations change or as business policy and rules change. The check deposit decision process 151 also ensures government compliance with the deposit regulations are not violated by the teller and ensure that business rules are maintained consistently for customers.

The teller does not have to manually try and figure out how to address the customer when the response provided by the host system 140 is disagreeable to the customer and the teller can explain to the customer that the result obtained from the check deposit decision process 151 is beyond her control and she lacks discretion to alter or override it. So, the customer gets the best possible service the bank can offer in the timeliest manner while at the bank and the bank and teller are protected from running afoul of regulations and unnecessary risk exposure.

In an embodiment, the customer manually approaches the teller at the teller station to make the check deposit. Here, the same processing occurs without the interaction of the ATM 100 and the local server 130.

In an embodiment, the local server 130 includes an instance of the check deposit decision process 135 that remains synchronized with the check deposit decision process 151 of the branch system 150. This may eliminate the teller completely from the processing flow and permit the hold on the check being deposited to be automatically overridden for better or for worse based on the decision produced by the check deposit decision process 135 of the local server.

In an embodiment, the teller may interact with the local server 130 to access the check deposit decision process rather than the branch system 150. This may occur when the branch system is down, slow, or just to speed up the transaction, or may occur based on configuration choices as to where the check deposit decision process 135 or 151 should be situated for optimal processing.

The matrix of regulations and bank rules are initially populated and maintained by a business analyst. This is fed as input along with the check image, transaction details, and customer information into the check deposit decision process (135 and/or 151).

One now appreciates how an incredibly complicated decision process can be streamlined in an automated fashion for near-real time decisions related to check deposits.

These embodiments and other embodiments are now discussed with reference to the FIGS. 2-4.

Figure 2:
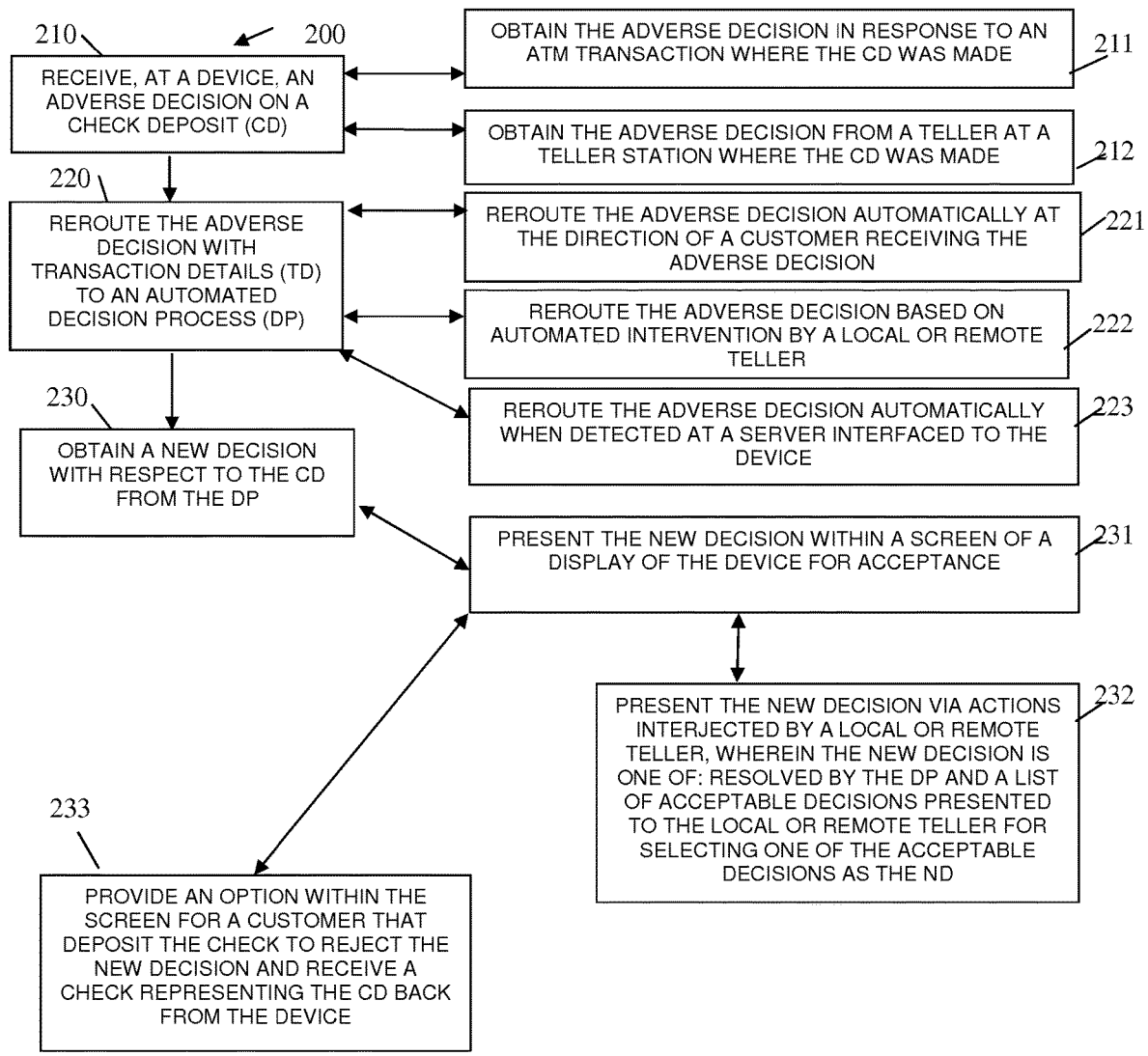
FIG. 2 is a diagram of a method for automated check deposit decisions, according to an example embodiment.

FIG. 2 is a diagram of a method 200 for automated check deposit decisions, according to an example embodiment. The software module(s) that implements the method 200 is referred to as a "deposit-assistance manager." The deposit-assistance manager is implemented as executable instructions programmed and residing within memory and/or a non-transitory computer-readable (processor-readable) storage medium and executed by one or more processors of a device. The processors of the device that executes the deposit-assistance manager are specifically configured and programmed to process the deposit-assistance manager. The deposit-assistance manager has access to one or more networks during its processing. The networks can be wired, wireless, or a combination of wired and wireless.

At 210, the deposit-assistance manager receives, at the device that executes the deposit-assistance manager, an adverse decision on a check deposit. An adverse decision is one that is not acceptable to the customer making the check deposit.

According to an embodiment, at 211, the deposit-assistance manager obtains the adverse decision in response to an ATM transaction where the check deposit was made. This can be a situation where the customer was at an ATM, deposited a check, and received a decision that was unfavorable from the host transaction server (such as long hold or rejected).

In an embodiment, at 212, the deposit-assistance manager obtains the adverse decision from a teller at a teller station where the check deposit was made. So, the customer is making a check deposit in person with a teller.

At 220, the deposit-assistance manager reroutes the adverse decision with transaction details to an automated decision process.

In an embodiment, the automated decision process is the check deposit decision process 151 of the FIG. 1.

In an embodiment, the automated decision process is the check deposit decision process 135 of the FIG. 1.

In an embodiment, at 221, the deposit-assistance manager reroutes the adverse decision automatically at the direction of a customer receiving the adverse decision, such as through the teller assistance interface 112 of the FIG. 1.

In an embodiment, at 222, the deposit-assistance manager reroutes the adverse decision based on an automated intervention by a local or remote teller, such as through the teller interface 134 of the FIG. 1 interfaced to a teller device 120 through a local bank branch server 130.

In an embodiment, at 223, the deposit-assistance manager reroutes the adverse decision automatically when detected at a server interfaced to the device, such as through the transaction authorization module 132 of the local server 130 of the FIG. 1.

At 230, the deposit-assistance manager obtains a new decision with respect to the check deposit from the automated decision process.

In an embodiment, at 231, the deposit-assistance manager presents the new decision within a screen of a display of the device for acceptance by the customer.

In an embodiment of 231 and at 232, the deposit-assistance manager presents the new decision via actions interjected by a local or remote teller. In an embodiment, the new decision is completely resolved by the automated decision process. In an embodiment, the new decision is a list of acceptable decisions for the local or remote teller to select from and the selected acceptable decision from the list is the new decision.

In another embodiment of 231 and at 233, the deposit-assistance manager provides an option within the screen for a customer that deposited the check to reject the new decision and receive a check representing the check deposit back from the device.

Figure 3:
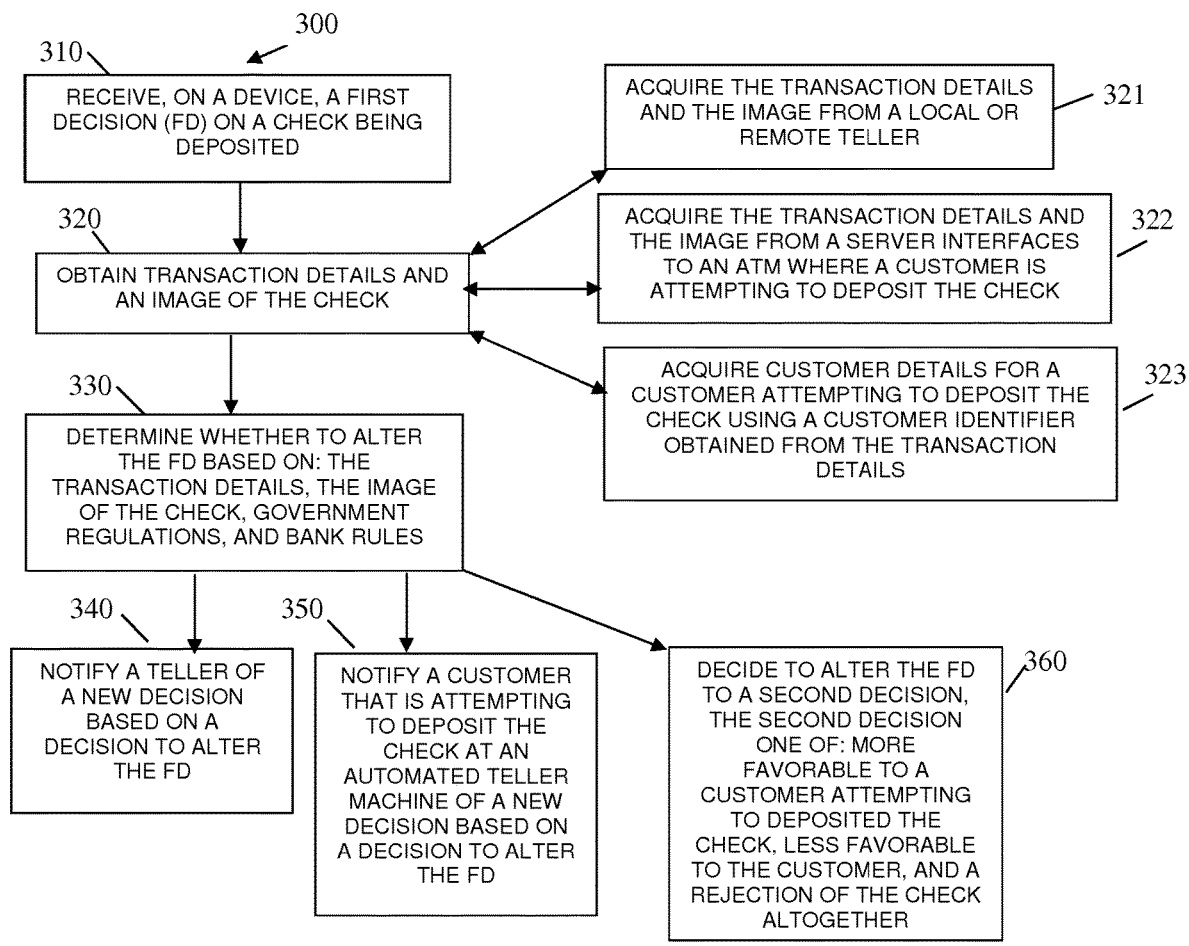
FIG. 3 is a diagram of another method for automated check deposit decisions, according to an example embodiment.

FIG. 3 is a diagram of another method 300 for automated check deposit decisions, according to an example embodiment. The software module(s) that implement the method 300 is referred to herein as a check deposit manager. The check deposit manager is implemented as executable instructions and programmed within memory and/or a non-transitory computer-readable (processor-readable) storage medium that executes on one or more processors of a device; the processors of the device are specifically configured to execute the check deposit manager. The check deposit manager can access one or more networks; the networks can be wired, wireless, or a combination of wired and wireless.

In an embodiment, the check deposit manager is the check deposit decision process 151 of the FIG. 1.

In an embodiment, the check deposit manager is the check deposit decision process 135 of the FIG. 1.

At 310, the check deposit manager receives, on a device that executes the check deposit manager, a first decision on a check being deposited.

At 320, the check deposit manager obtains transaction details and an image of the check.

According to an embodiment, at 321, the check deposit manager acquires the transaction details and the image from a local or remote teller.

In an embodiment, at 322, the check deposit manager acquires the transaction details and image from a server interfaces to an ATM where a customer is attempting to deposit check.

In an embodiment, at 323, the check deposit manager acquires customer details for a customer attempting to deposit the check using a customer identifier obtained from the transaction details. For example, the customer identifier is used to look up the customer in a loyalty database and obtain a profile with account history and account status and loyalty level.

At 330, the check deposit manager determines whether to alter the first decision based on: the transaction details, the image of the check, government regulations, and bank rules or policies.

In an embodiment, at 340, the check deposit manager notifies a teller of a new decision based on a decision to alter the first decision.

In an embodiment, at 350, the check deposit manager notifies a customer that is attempting to deposit the check at an ATM of a new decision based on a decision to alter the first decision.

In an embodiment, at 360, the check deposit manager decides to alter the first decision to a second decision. The second decision is one of: more favorable to the customer attempting to deposit the check, less favorable to the customer, and a rejection of the check being deposited altogether.

Figure 4:
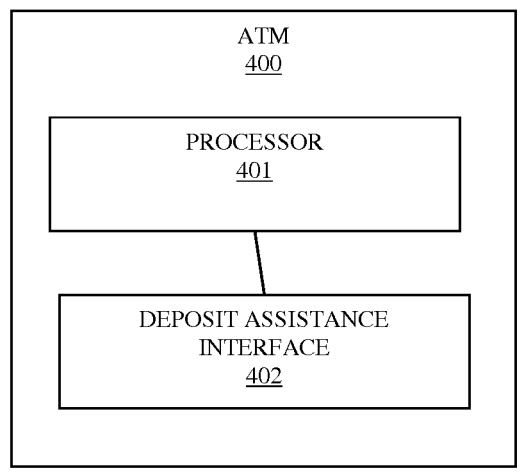
FIG. 4 is a diagram of an Automated Teller Machine (ATM), according to an example embodiment.

FIG. 4 is a diagram of an ATM 400, according to an example embodiment. Various components of the ATM 400 are programmed and reside within memory and/or a non-transitory computer-readable medium and execute on one or more processors of one or more devices. The ATM 400 has access and can communicate over one or more networks; and the networks can be wired, wireless, or a combination of wired and wireless.

In an embodiment, the ATM 400 is the ATM 100 of the FIG. 1.

The ATM 400 includes a processor 401 and a deposit assistance interface 402.

The deposit assistance interface 402 is configured and adapted to: execute on the processor 401 and interact with a second interface to have a first decision made on a check deposited by a customer at the ATM 400 automatically reevaluated to provide a second decision while the customer remains at the ATM 400.

In an embodiment, the deposit assistance interface 402 is further adapted and configured to present the second decision within a screen of a display for the ATM 400 along with options for the customer to accept or reject the second decision.

In an embodiment, the second interface is a teller interface operated by a local or remove teller through the teller interface 134 of the FIG. 1 using the teller device 120.

In an embodiment, the second interface is an automated interface available on a local server interfaced to the ATM 400, such as the transaction authorization module 132 of the FIG. 1 interfaced to the check deposit decision process 135 of the local server 130.

It should be appreciated that where software is described in a particular form (such as a component or module) this is merely to aid understanding and is not intended to limit how software that implements those functions may be architected or structured. For example, modules 135 and 151 are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, at an Automated Teller Machine (ATM), an adverse decision on a check deposit from a host system via a host interface between the ATM and the host system, wherein receiving further includes providing the adverse decision to a customer who is attempting to make the check deposit and is operating the ATM for performing the check deposit;
routing, by the ATM through a server interface:
the adverse decision, transaction details, and an image of the check deposit to an automated decision process of a branch system that is remote from the ATM for providing a new decision in near-real time for the check deposit as the customer continues operating the ATM and attempting to make the check deposit at the ATM,
wherein routing further includes processing, by the automated decision process, the transaction details, the image of the check, check regulation factors including check minimum holds and date by which release of funds to the customer must be made, bank factors for a bank that is accepting the check deposit, an image quality factor for the image, and account factors for an account of the customer with the bank of the customer,
wherein routing further includes:
asking the customer through the ATM whether assistance is needed by the customer in view of the adverse decision received by a teller that is operating a teller-operated device by presenting a request for assistance on the ATM;
receiving a remote activation issued from a teller-operated device based on a response received from the customer that activates the request for assistance on the ATM;
activating a teller assistance interface on the ATM based on the remote activation received from the teller-operated device; and
obtaining, by the ATM, the new decision with respect to the check deposit from the automated decision process through the server interface, wherein obtaining further includes providing the new decision to the customer still operating the ATM since the adverse decision was provided to the customer is still attempting to make the check deposit at the ATM for successfully depositing, and wherein obtaining further includes successfully processing the check deposit through the ATM based on the new decision.

2. The method of claim 1, wherein receiving further includes obtaining the adverse decision in response to an Automated Teller Machine (ATM) transaction where the check deposit was made.

3. The method of claim 1, wherein routing further includes routing the adverse decision automatically at the direction of the customer receiving the adverse decision.

4. The method of claim 1, wherein routing further includes routing the adverse decision based on automated intervention by a local or remote teller.

5. The method of claim 1, wherein obtaining further includes presenting the new decision within a screen of a display of the ATM for acceptance.

6. The method of claim 5, wherein presenting further includes presenting the new decision via actions interjected by a local or remote teller, and wherein the new decision is one of: resolved by the automated decision process and a list of acceptable decisions presented to the local or remote teller for selecting one of the acceptable decisions as the new decision.

7. The method of claim 5, wherein obtaining further includes providing an option within the screen of the ATM for the customer that deposited the check to reject the new decision and receive a check representing the check deposit back from the ATM.

8. A method, comprising:
receiving, on a device that is remote from an Automated Teller Machine (ATM), a first decision on a check being deposited at the ATM by a customer attempting to deposit the check at the ATM, wherein the first decision is provided by a host system to the ATM and the first decision then provided by the ATM through a server interface to the device;
obtaining transaction details and an image of the check as provided by the customer to the ATM when attempting to deposit the check, wherein the receiving and the obtaining are processed responsive to activating a request for assistance on the ATM during the deposit after the customer is asked through the ATM whether assistance is needed by the customer in view of the first decision, wherein activating the request for assistance further includes activating a teller assistance interface on the ATM based on remote activation made by a teller that is operating a teller-operated device and the teller-operated device received the first decision and is used by the teller for asking the customer whether assistance is needed by the teller through the remotely activated teller assistance interface; and
determining whether to alter the first decision based on: the transaction details, the image of the check, government regulations including check minimum holds and date by which release of funds to the customer must be made, bank factors for bank processing the deposit, account factors relevant to an account of the customer with a bank of the customer, and an image quality factor for the image, and wherein determining further includes determining whether to alter the first decision in near-real time and when the customer is still operating the ATM and attempting to deposit the check, and wherein determining further includes resolving and successfully depositing the check through the ATM.

9. The method of claim 8 further comprising, notifying the teller of a new decision based on a decision to alter the first decision.

10. The method of claim 8 further comprising, notifying the customer that is attempting to deposit the check at an Automated Teller Machine of a new decision based on a decision to alter the first decision.

11. The method of claim 8, wherein obtaining further includes acquiring the transaction details and the image from a local or remote teller.

12. The method of claim 8, wherein obtaining further includes acquiring the transaction details and the image from a server interfaces to the Automated Teller Machine where a customer is attempting to deposit the check.

13. The method of claim 8, wherein obtaining further includes acquiring customer details for the customer attempting to deposit the check using a customer identifier obtained from the transaction details.

14. The method of claim 8 further comprising, deciding to alter the first decision to a second decision, the second decision one of:
more favorable to a customer attempting to deposit the check, less favorable to the customer, and a rejection of the check altogether.

15. An Automated Teller Machine (ATM), comprising:
a processor; and
a deposit assistance interface configured and adapted to:
i) execute on the processor and ii) interact with a second interface that is remote from the ATM to have a first decision made on a check that is being attempted to be deposited by a customer at the ATM, wherein the first decision made by a host system and provided to the ATM through a host interface, and wherein the first decision is automatically re-evaluated to provide a second decision in near-real time while the customer remains at the ATM when a request for assistance option at the ATM is activated after the customer is asked through the ATM whether assistance is needed by the customer in view of the first decision, wherein the second interface is remotely activated on the ATM by a teller that is operating a teller-operated device and the teller received the first decision and the teller asks the customer via the teller-operated device whether assistance is needed through the remotely activated second interface, wherein the customer continues to operate the ATM, and attempts to successfully deposit the check when the second interface is remotely activated on the ATM by the teller-operated device, wherein interaction with the second decision further includes providing through a server interface to a server: check regulation factors including check minimum holds and date by which release of funds to the customer must be made, account factors for an account of the customer with a bank of the customer, bank factors for the bank, and an image factor for an image of the check, and (iii) resolve the attempted deposit of the check at the ATM based on the second decision provided through the server interface.

16. The Automated Teller Machine (ATM) of claim 15, wherein the second interface is a teller interface operated by a local or remote teller.

17. The Automated Teller Machine (ATM) of claim 15, wherein the second interface is an automated interface available on a local server interfaced to the ATM.

18. The Automated Teller Machine (ATM) of claim 15, wherein the deposit assistance interface is further adapted and configured to: iv) present the second decision within a screen of a display for the ATM along with the options for the customer to accept or reject the second decision.

* * * * *